(12) United States Patent
Bouarroudj et al.

(10) Patent No.: US 9,871,420 B2
(45) Date of Patent: Jan. 16, 2018

(54) ROTOR FOR A ROTARY ELECTRIC MACHINE AND ROTARY ELECTRIC MACHINE COMPRISING SUCH A ROTOR

(71) Applicant: VALEO EQUIPEMENTS ELECTRIQUES MOTEUR, Creteil (FR)

(72) Inventors: Lilya Bouarroudj, Charenton le Pont (FR); Jean-Claude Matt, Dijon (FR); Jean-Claude Labrosse, Charenton le Pont (FR)

(73) Assignee: Valeo Equipements Electriques Moteur (FR)

( * ) Notice: Subject to any disclaimer, the term of this patent is extended or adjusted under 35 U.S.C. 154(b) by 294 days.

(21) Appl. No.: 14/362,363

(22) PCT Filed: Oct. 30, 2012

(86) PCT No.: PCT/FR2012/052510
§ 371 (c)(1),
(2) Date: Jun. 2, 2014

(87) PCT Pub. No.: WO2013/079840
PCT Pub. Date: Jun. 6, 2013

(65) Prior Publication Data
US 2014/0333168 A1 Nov. 13, 2014

(30) Foreign Application Priority Data

Dec. 1, 2011 (FR) ...................................... 11 61016

(51) Int. Cl.
*H02K 1/27* (2006.01)
*H02K 21/12* (2006.01)

(52) U.S. Cl.
CPC .......... *H02K 1/2773* (2013.01); *H02K 1/2706* (2013.01); *H02K 21/12* (2013.01); *H02K 2201/03* (2013.01); *H02K 2213/03* (2013.01)

(58) Field of Classification Search
CPC ............... H02O 1/2773; H02O 1/2706; H02O 2213/03; H02K 1/2773; H02K 1/2706; H02K 2213/03

(Continued)

(56) References Cited

U.S. PATENT DOCUMENTS 8,564,166 B2 * 10/2013 Pan ........................ H02K 21/16
310/156.48
9,024,498 B2 * 5/2015 Murakami ........... H02K 1/2773
310/156.43

(Continued)

FOREIGN PATENT DOCUMENTS

EP 0391791 10/1990
EP 1420499 5/2004

(Continued)

*Primary Examiner* — Hanh Nguyen
*Assistant Examiner* — Leda Pham
(74) *Attorney, Agent, or Firm* — Berenato & White, LLC (57) ABSTRACT

A rotor (1) comprising a plurality of alternating magnetic poles formed by permanent magnets (3) distributed regularly between a circumferential portion (5) and a central portion (6) of the magnetic body (2) and defining circumferential pole sections (7). The pole sections have a pre-determined pole pitch (Thetarho) and comprise a lobe-forming radial section (8). The lobe-forming radial section partially covers the magnets, such as to maximize a useful magnetic flux (PhiU) flowing radially through each of the pole sections and to minimize a leakage magnetic flux flowing through the circumferential portion. The pole sections can have a pre-determined pole overlap angle (Thetar) such as to maximize the useful magnetic flux (PhiU) and to minimize the leakage magnetic flux (PhiL), said overlap (Continued)

angle (Thetar) being a viewing angle of the lobe (8) from a point on the axis of the rotor.

11 Claims, 5 Drawing Sheets

(58) Field of Classification Search
    USPC .......................... 310/156.53, 156.57, 156.58
    See application file for complete search history.

(56) References Cited

U.S. PATENT DOCUMENTS

| 2003/0107290 | A1* | 6/2003 | De Filippis | H02K 1/146 |
| | | | | 310/216.008 |
| 2009/0096308 | A1* | 4/2009 | Staudenmann | H02K 1/2773 |
| | | | | 310/156.08 |
| 2013/0057103 | A1* | 3/2013 | Han | H02K 1/2773 |
| | | | | 310/156.12 |

FOREIGN PATENT DOCUMENTS

| EP | 2246962 | 11/2010 |
| FR | 2084279 | 12/1971 |
| WO | 01/22560 | 3/2001 |

* cited by examiner

ROTOR FOR A ROTARY ELECTRIC MACHINE AND ROTARY ELECTRIC MACHINE COMPRISING SUCH A ROTOR

CROSS-REFERENCE TO RELATED APPLICATIONS AND CLAIM TO PRIORITY

This application is a national stage application of International Application No. PCT/FR2012/052510 filed Oct. 30, 2012, which claims priority to French Patent Application No. 1161016 filed Dec. 1, 2011, of which the disclosures are incorporated herein by reference and to which priority is claimed.

TECHNICAL FIELD OF THE INVENTION

The present invention relates to a rotor with permanent magnets which is designed for a rotary electrical machine.

The invention also relates to a rotary electrical machine comprising a rotor of this type, in particular for applications in the field of motor vehicles.

TECHNOLOGICAL BACKGROUND OF THE INVENTION

As a result of their increased performance in terms of output, specific power and power density, nowadays synchronous machines with permanent magnets have extensive application in the field of motor vehicles.

These electrical machines can be produced with a wide range of powers and speeds, and have applications both in vehicles of the "all-electric" type, and in vehicles based on $CO_2$ of the so-called "mild-hybrid" and full-hybrid" types.

The "mild-hybrid" applications generally concern electrical machines of approximately 8 to 10 kW, for example an electric motor which is fitted to the front of the thermal engine, and is coupled to the latter by a drive belt. By means of an electric motor of this type, it is possible to reduce the capacity of the thermal engine ("engine downsizing") by providing electric torque assistance which supplies additional power, in particular during revving up. In addition, traction at low speed, for example in an urban environment, can also be ensured by this same electric motor.

Another example of an application of electrical machines in this power range consists of driving a centrifugal compressor of a double boosting system of a thermal engine. At low speed the electric compressor assists the turbo compressor which is driven by the exhaust gases, and makes it possible to dispense with an additional step in reduction of the capacities.

Applications of the "full-hybrid" type generally concern 30 to 50 kW motors for architectures of the series and/or parallel type, with a better level of integration of the electric motor(s) in the traction chain of the vehicle.

The remarkable performance levels of the present machines with permanent magnets are largely due to the development of rare earth magnets such as magnets of the neodymium-iron-boron (NeFeB), samarium-iron (SmFe) or samarium-cobalt (SmCo) type, which can have remanence in excess of a tesla.

However, machines with permanent magnets comprising a rotor with a so-called "flux concentration" structure have long since made it possible to obtain substantial magnetic fluxes using magnets with lower remanence, for example magnets obtained from sintered or bonded ferrites.

Also dating back a long time, the dimensional and magnetic characteristics of this type of structure have been optimised, either by undertaking many tests, or more recently by carrying out computer simulations, such as to improve the electric output of the machines.

An example of dimensional optimisation of the magnets and magnetic poles of a rotor with permanent magnets was disclosed in 1971 in the patent of invention FR 2.084.279.

The dimensional optimisation of the magnetic poles has recently come to the forefront of attention once more as a result of rare earth magnets becoming more expensive, because of an unfavourable geopolitical situation.

Since the use of rare earth magnets in a rotor of an electrical machine designed for motor vehicle applications is no longer economically viable, and probably not long-lasting, the other alternative consists of magnets based on ferrites.

However, since the remanence of a ferrite is lower than that of a rare earth magnet, the replacement of rare earth magnets by ferrites leads to a machine with lower performance levels.

GENERAL DESCRIPTION OF THE INVENTION

The object of the present invention is thus to optimise the form of the poles of a rotor in order to maximise the magnetic flux in the poles, and thus in particular to preserve the torque of the machine.

Its objective is specifically a rotor of a rotary electrical machine comprising a plurality of alternating North poles and South poles formed from a plurality of permanent magnets arranged in first recesses.

These first recesses extend along an axis of the rotor, and are distributed regularly between a circumferential part and a central part of the magnetic body of the rotor, such as to define a plurality of circumferential polar sections with a predetermined polar pitch.

The permanent magnets of the rotor type in question have a first polygonal radial section and a first axial plane of symmetry.

The polar sections for their part have a second radial section which forms a lobe on the exterior, and a second axial plane of symmetry.

The rotor according to the invention is distinguished in that this lobe overlaps partially the permanent magnets, such as to maximise a useful magnetic flux which circulates radially in each of the polar sections, and to minimise a magnetic leakage flux which circulates in a circumferential direction in the circumferential part of the rotor, the polar sections of the rotor having a predetermined polar overlapping angle such as to maximise this useful magnetic flux and to minimise the magnetic leakage flux, this polar overlapping angle being defined as a viewing angle of the lobe from a point of the axis of the rotor, the polar sections preferably having a predetermined overlapping ratio such as to maximise the useful magnetic flux and to minimise the magnetic leakage flux, the overlapping ratio being equal to a ratio of the polar overlapping angle to the predetermined polar pitch, and the overlapping ratio is substantially contained between 0.35 and 0.50.

The rotor according to the invention is also distinguished in that the first radial section of the permanent magnets comprises a rectangular part close to the circumferential part, adjacent to a part in the form of a wedge close to the central part.

Highly advantageously, the rotor according to the invention additionally comprises at least a plurality of second recesses which extend axially, and are arranged between the permanent magnets, in an intermediate part of the rotor, between the central part and the circumferential part.

Non-magnetic braces are preferably arranged in these second recesses.

In a variant embodiment of the rotor according to the invention, the circumferential part highly advantageously additionally comprises axial grooves which are arranged between the polar sections, facing the permanent magnets, and form the opening of the first recesses.

Advantage will be derived from the fact that the permanent magnets of the rotor of the rotary electrical machine according to the invention consist of ferrite.

The invention also relates to a rotary electrical machine which comprises a rotor with the above characteristics.

These few essential specifications will have made apparent to persons skilled in the art the advantages provided by the rotor of the rotary electrical machine according to the invention, as well as by the corresponding electrical machine, in comparison with the prior art.

The detailed specifications of the invention are given in the following description in association with the appended drawings. It should be noted that these drawings serve the purpose simply of illustrating the text of the description, and do not constitute in any way a limitation of the scope of the invention.

DESCRIPTION OF THE PREFERRED
EMBODIMENTS OF THE INVENTION

Figure 1:
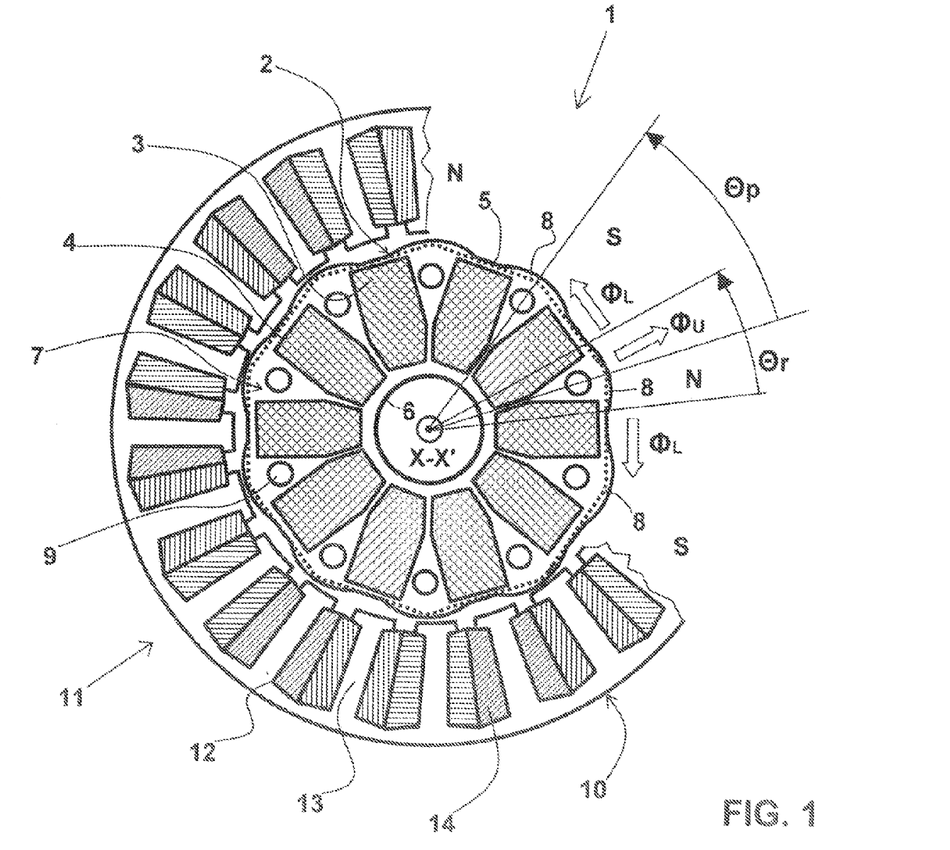
FIG. 1 shows a view in simplified radial cross-section of a rotor with permanent magnets in a main embodiment of the invention, arranged in a stator, shown in partial radial cross-section, of a rotary electrical machine according to the invention.

The simplified radial cross-section of a rotor 1 with permanent magnets in the main embodiment of the invention represented in FIG. 1 shows clearly the arrangement in the magnetic body 2 of the permanent magnets 3 in first recesses 4 which are distributed regularly between a circumferential part 5 and a central part 6, such as to form a plurality of alternating North poles N and South poles S.

The rotor 1 according to the invention is of the flux concentration type. The permanent magnets 3 have a globally substantially rectangular cross-section, but are chamfered in the form of a wedge towards the axis X-X' of the rotor 1. They extend symmetrically in the vicinity of equi-angular axial planes.

The first recesses 4 in which the permanent magnets 3 are arranged delimit ten circumferential polar sections 7.

The assembly of these polar sections 7 forms in radial cross-section a substantially circular figure with a plurality of lobes 8, corresponding to the prominence of the poles N, S.

The polar sections 7 comprise second recesses 9 which are arranged between the permanent magnets 3. They extend symmetrically in the vicinity of equi-angular axial planes.

These second recesses 9 have a circular cross-section, and receive non-magnetic braces which retain the sets of metal plates which form magnetic bodies 2, 10 of the rotor 1 and of a stator 11.

These second recesses 9 also contribute towards controlling the magnetic field in the rotor 1.

According to a particular embodiment of this machine, the rotor 1 comprising ten permanent magnets 3 rotates inside a stator 11 which has a plurality of notches 12 defining a plurality of stator teeth 13, around which stator windings 14 are arranged.

A specific embodiment of a machine comprising a rotor of this type is for example an 8 to 10 kW motor/generator for applications in motor vehicles of the so-called "mild-hybrid" type.

In its mode in which it is functioning as a motor, this machine can be designed for starting of the thermal engine, torque assistance for the thermal engine, electric traction at low speed of the vehicle, as well as for driving of a centrifugal compressor.

A stator current passes through the stator windings 14, which create a rotary magnetic field which drives the rotor 1. The engine torque supplied depends in particular on the intensity of the stator current and on the magnetic flux in the rotor 1.

As explained in the preamble, the replacement of the rare earth permanent magnets 3 by ferrite permanent magnets 3 requires optimisation of the magnetic poles N, S, in order to obtain a similar magnetic flux in the rotor 1, and thus maintain the same engine torque for the same stator intensity.

Computer simulations of electrical machines comprising a rotor 1 with the above characteristics have allowed the inventive body to establish the distribution of the magnetic flux in the rotor 1 and in the stator 11.

It has been established that the magnetic flux which is created by the permanent magnets 3, and circulates in the magnetic body 2 of the rotor 1, is distributed between a useful magnetic flux $\Phi U$ which circulates radially in a polar section 7, and a magnetic leakage flux $\Phi L$ which circulates in a circumferential direction in the circumferential part 5 of the rotor 1.

The useful magnetic flux $\Phi U$ depends on the overlapping of the permanent magnets 3 by the lobes 8 of the polar sections 7. The greater this overlapping, the more the useful magnetic flux $\Phi U$ can increase, but the magnetic leakage flux $\Phi L$ also increases, which has the effect of decreasing the useful magnetic flux $\Phi U$. Optimum overlapping therefore exists, which is determined by the simulation, for which the useful magnetic flux $\Phi U$ is maximum and the magnetic leakage flux $\Phi L$ is minimum.

The polar overlapping angle Θr, i.e. the viewing angle of a lobe 8 from a point of the axis X-X' of the rotor 1, is a parameter which makes it possible to quantify the overlapping of the permanent magnets 3 by the polar sections 7.

FIG. 1 shows clearly an example of partial overlapping of the permanent magnets 3 by the lobes 8 on the periphery of the rotor 1 (with the broken line showing the outer surface of a non-optimised rotor).

Figure 2:
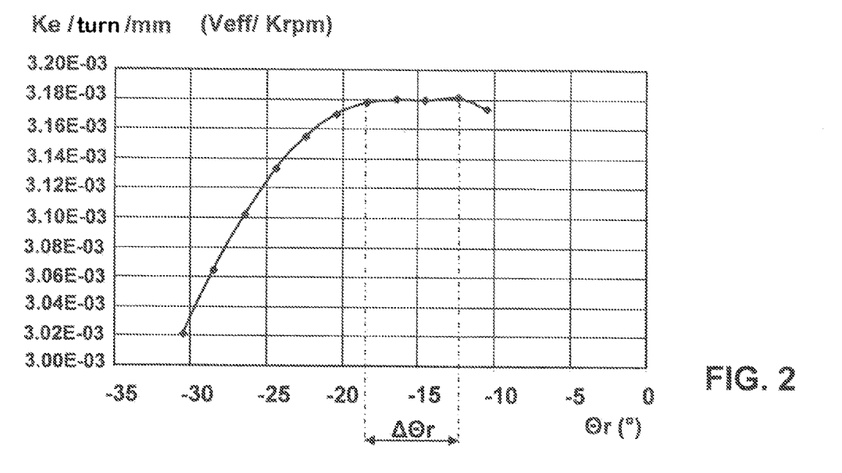
FIG. 2 shows the variation of the electromotive force constant between phases representative of the useful magnetic flux in the polar sections, according to the polar overlapping angle.

FIG. 2 is the result of a computer simulation of a particular prototype of a rotary electrical machine comprising the above-described rotor, which shows the development of the electromotive force constant between phases Ke for values of the polar overlapping angle Θr contained substantially between 10° and 30° (in absolute values).

This constant Ke is representative of the useful magnetic flux ΦU. It is found that it decreases for a polar overlapping angle Θr which is smaller than 12° (little or no overlapping), and for a polar overlapping angle Θr which is larger than 18° (the magnetic leakage flux ΦL becomes preponderant). There is therefore a range ΔΘr of optimum values of the angular overlapping angle Θr contained substantially between 12° and 18° where the useful magnetic flux ΦU is maximum and the magnetic leakage flux ΦL is minimum.

The inventive body has determined that an optimisation parameter applied to a rotor 1 with any number Np of poles N, S is an overlapping ratio R defined as the ratio Θr/Θp of the polar overlapping angle Θr to the polar pitch Θp of the rotor 1 (the polar pitch Θp in degrees being equal to 360°/Np).

Figure 3:
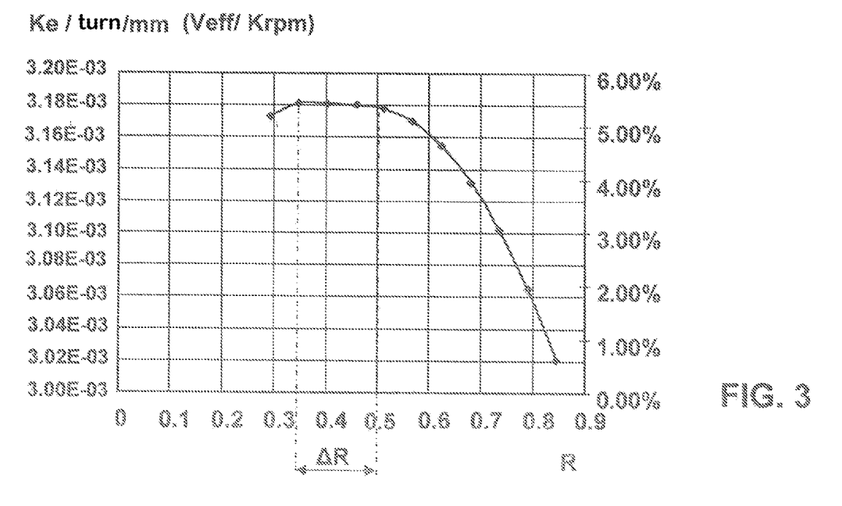
FIG. 3 shows the variation of the electromotive force constant between phases representative of the useful magnetic flux in the polar sections, according to the overlapping ratio.

FIG. 3, also established by means of a computer simulation, shows the development of the electromotive force constant Ke between phases according to this overlapping ratio R for the above-described rotor with ten poles (Θp=36°).

It is found that the maximum of Ke (i.e. the maximum of the useful magnetic flux ΦU) is obtained for a set ΔR of values of R contained substantially between 0.35 and 0.50. The gain is approximately 5% between the optimised rotor 1 according to the invention and a non-optimised rotor (represented in a broken line in FIG. 1).

This optimised structure of the rotor 1 makes it possible to preserve the performance levels of the machine when ferrites are used instead of rare earth magnets, without increasing excessively the body of the permanent magnets 3.

With constant technology, the invention which contributes towards the increase in the magnetic flux in the rotor 1 also makes it possible to reduce the intensity of the rotary magnetic field created by the stator 11, which is necessary in order to produce a given torque, and consequently makes it possible to reduce the body of copper necessary in order to produce the stator windings 14.

The reduction of the body of the permanent magnets and of the copper makes it possible to reduce the manufacturing costs, and therefore provides a commercial advantage in the highly competitive field of vehicle equipment.

However, the possibilities of optimisation of the form of the poles N, S in the above-described main embodiment of the invention, using the polar overlapping angle, are limited by the fact that the circumferential part 5, which is more or less thick in relation to the permanent magnets 3, has a leakage reluctance.

Figure 4:
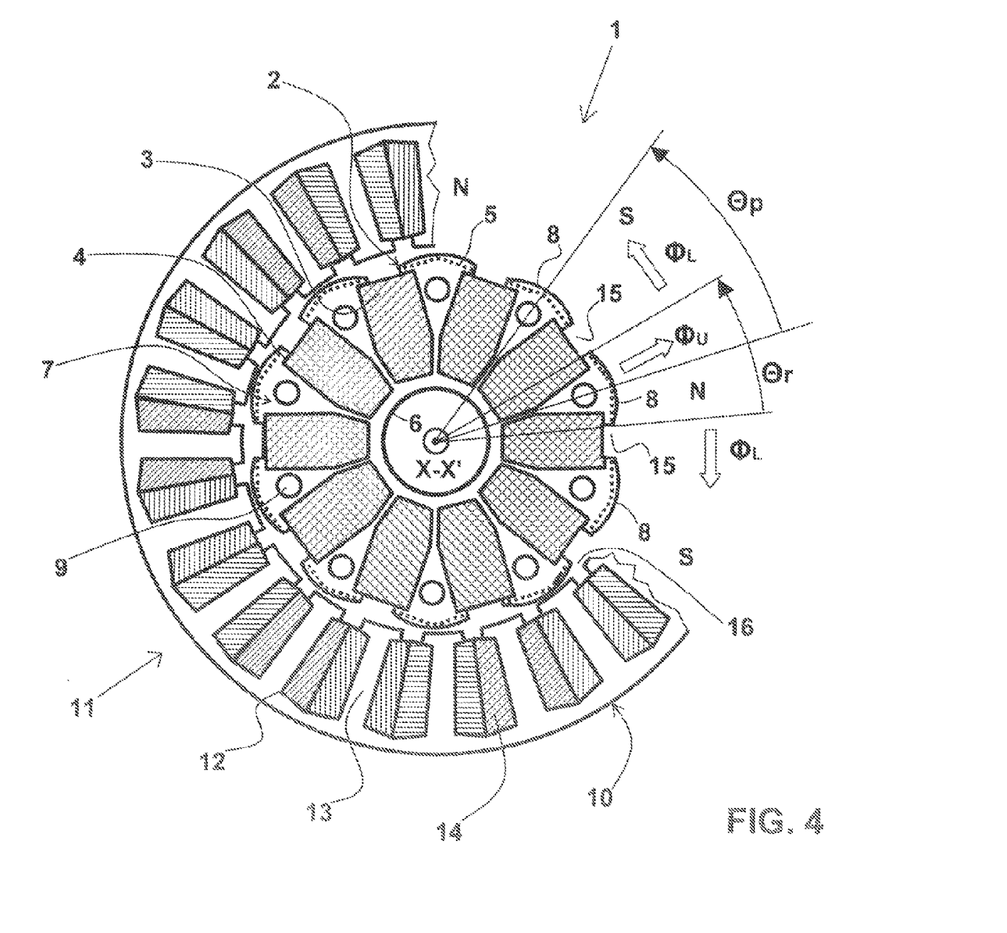
FIG. 4 shows a view in simplified radial cross-section of a rotor with permanent magnets according to a variant embodiment of the invention, arranged in a stator, shown in partial radial cross-section, of a rotary electrical machine according to the invention.

In a variant embodiment shown in FIG. 4, the circumferential part 5 of the rotor 1 additionally comprises axial grooves 15 which are arranged between the polar sections 7 facing the permanent magnets 3. These grooves 15 form openings in the first recesses 4, and expose the magnets 3 to the air of the air gap 16. They therefore constitute a flux barrier, which makes it possible to increase the polar overlapping angle Θr without this resulting in an excessively large increase in the magnetic leakage flux ΦL.

Figure 5A:
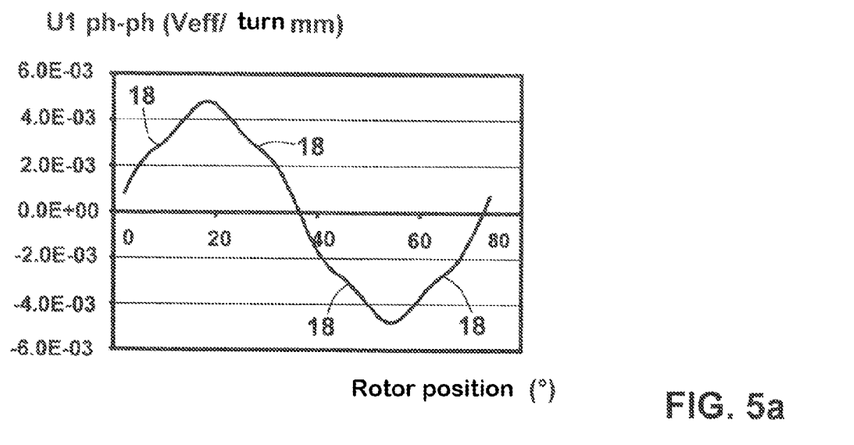
FIGS. 5a and 5b show respectively the wave form of the electromotive force between phases off-load, and the corresponding harmonic levels of a rotary electrical machine comprising a rotor according to the main embodiment of the invention shown in FIG. 1.
Figure 5B:
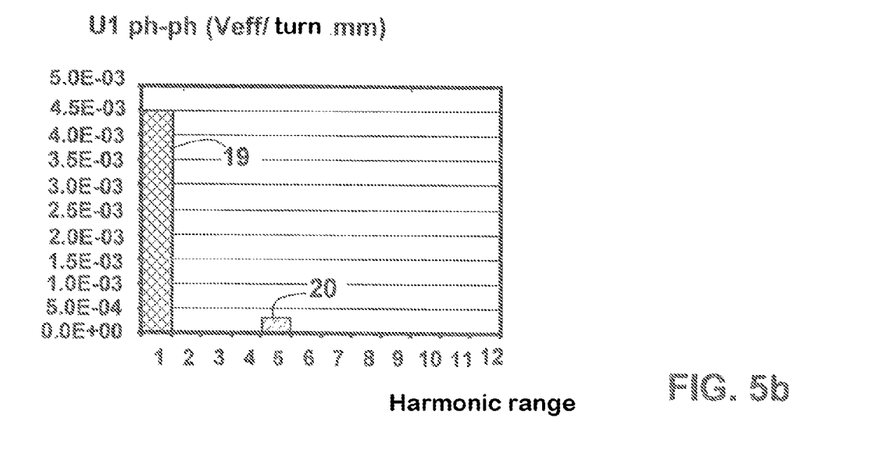
Figure 6A:
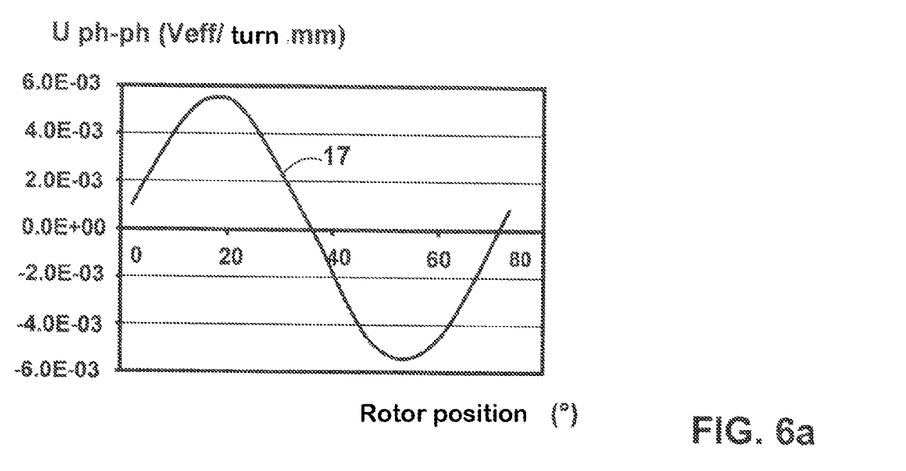
FIGS. 6a and 6b show respectively the wave form of the electromotive force between phases off-load, and the corresponding harmonic levels of a rotary electrical machine comprising a rotor according to the variant embodiment of the invention shown in FIG. 4.
Figure 6B:
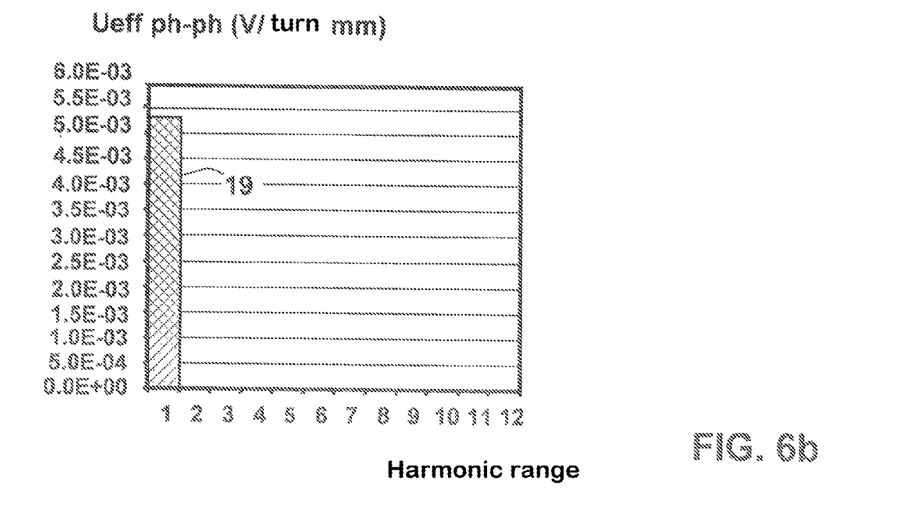

The advantage of this variant is the reduction of the magnetic noise generated by the machine in comparison with the main embodiment, thanks to the decrease in the harmonic distortions of the electromotive force and the torque, as shown by FIGS. 6a and 6b on the one hand, in comparison with FIGS. 5a and 5b on the other hand, corresponding to the two embodiments respectively.

In fact, a wave form 17 of the electromotive force between phases U2 ph-ph, off-load, of a machine comprising a rotor 1 according to this variant (FIG. 4) appears to be substantially sinusoidal in FIG. 6a, whereas it has distortions 18 in FIG. 5a.

FIG. 6b confirms that there are no harmonics other than the basic harmonic 19, whereas a fifth rank harmonic 20, with an amplitude representing more than 6% of the basic harmonic 19, is present in the other electromotive force between phases U1 ph-ph, off-load, of a machine comprising a rotor 1 according to the main embodiment (FIG. 1).

It will be appreciated that the invention is not limited simply to the above-described preferred embodiments.

Other embodiments based on numerical values different from those specified above, in particular a different number of poles Np, and corresponding to other tests or simulations of rotary electrical machines comprising a rotor of the type described, would not depart from the context of the present invention, provided that they are derived from the following claims.

The invention claimed is:

1. A rotor (1) of a rotary electrical machine, comprising:
a plurality of alternating North (N) poles and South (S) poles formed from a plurality of permanent magnets (3) arranged in first recesses (4) which extend along an axis (X-X') of said rotor (1), and are distributed regularly between a circumferential part (5) and a central part (6) of a magnetic body (2) of said rotor (1), defining a plurality of circumferential polar sections (7) $N_p$ with a predetermined polar pitch (Θp), the polar pitch being equal to $360°/N_p$,
said permanent magnets (3) having a first polygonal radial section and a first axial plane of symmetry, and said circumferential polar sections (7) having a second radial section which forms a lobe (8) on the exterior and a second plane of axial symmetry, wherein the plurality of circumferential polar sections define a substantially circular radial cross section, with a plurality of said lobes (8) extending radially therefrom, wherein:
said lobe (8) partially overlaps said permanent magnets (3) said circumferential polar sections (7) having a predetermined polar overlapping angle (Θr) with respect to said lobe, maximizing useful magnetic flux (ΦU) and minimizing magnetic leakage flux (ΦL), said polar overlapping angle (Θr) being a viewing angle defining the lobe (8) from a point of said axis (X-X') of the rotor, said circumferential polar sections (7) having a predetermined overlapping ratio (R), said overlapping ratio (R) being equal to a ratio of said polar overlapping angle (Θr) to said predetermined polar pitch (Θp), and said overlapping ratio (R) is substantially contained between 0.35 and 0.50 and wherein said permanent magnets consist essentially of ferrite .

2. Rotor (1) of a rotary electrical machine according to claim 1, characterized in that said first polygonal radial section comprises a rectangular part oriented towards said circumferential part (5), adjacent to a part in the form of a wedge oriented towards said central part (6).

3. Rotor (1) of a rotary electrical machine according to claim 2, characterized in that it comprises at least a plurality of second recesses (9) which extend axially, and are arranged between said permanent magnets (3), in an intermediate part of said rotor (1), between said central part (6) and said circumferential part (5).

4. Rotor (1) of a rotary electrical machine according to claim 2, characterized in that said circumferential part (5) additionally comprises axial grooves (15) which are arranged between said polar sections (7), facing said permanent magnets (3), and form the opening of said first recesses (4).

5. Rotary electrical machine, characterized in that it comprises a rotor (1) according to claim 2.

6. Rotor (1) of a rotary electrical machine according to claim 1 characterized in that it comprises at least a plurality of second recesses (9) which extend axially, and are arranged between said permanent magnets (3), in an intermediate part of said rotor (1), between said central part (6) and said circumferential part (5).

7. Rotor (1) of a rotary electrical machine according to claim 6, characterized in that non-magnetic braces are arranged in said second recesses (9).

8. Rotor (1) of a rotary electrical machine according to claim 7, characterized in that said circumferential part (5) additionally comprises axial grooves (15) which are arranged between said polar sections (7), facing said permanent magnets (3), and form the opening of said first recesses (4).

9. Rotor (1) of a rotary electrical machine according to claim 6, characterized in that said circumferential part (5) additionally comprises axial grooves (15) which are arranged between said polar sections (7), facing said permanent magnets (3), and form the opening of said first recesses (4).

10. Rotor (1) of a rotary electrical machine according to claim 1, characterized in that said circumferential part (5) additionally comprises axial grooves (15) which are arranged between said polar sections (7), facing said permanent magnets (3), and form the opening of said first recesses (4).

11. Rotary electrical machine, characterized in that it comprises a rotor (1) according to claim 1.

\* \* \* \* \*